(12) United States Patent
Hamada et al.

(10) Patent No.: US 8,393,801 B2
(45) Date of Patent: Mar. 12, 2013

(54) OUTER RING OF TAPERED ROLLER BEARING AND TAPERED ROLLER BEARING

(75) Inventors: Kazuki Hamada, Kashiwara (JP); Hiroshi Ueno, Tondabayashi (JP); Isao Usuki, Yamatotakada (JP); Hironori Hiraoka, Yao (JP)

(73) Assignee: Jtekt Corporation, Osaka (JP)

( * ) Notice: Subject to any disclaimer, the term of this patent is extended or adjusted under 35 U.S.C. 154(b) by 0 days.

(21) Appl. No.: 13/304,546

(22) Filed: Nov. 25, 2011

(65) Prior Publication Data
US 2012/0141060 A1    Jun. 7, 2012

(30) Foreign Application Priority Data

Dec. 6, 2010 (JP) ................... 2010-271519

(51) Int. Cl.
*F16C 33/58* (2006.01)

(52) U.S. Cl. ........................................ 384/571

(58) Field of Classification Search .............. 384/571, 384/569
See application file for complete search history.

(56) References Cited

U.S. PATENT DOCUMENTS

| 1,672,012 | A | * | 6/1928 | Tyson | 384/565 |
| 1,830,493 | A | * | 11/1931 | Tyson | 384/581 |
| 3,404,925 | A | * | 10/1968 | Bailey | 384/535 |
| 3,653,731 | A | | 4/1972 | Rau | |
| 2011/0026867 | A1 | | 2/2011 | Hamada et al. | |

FOREIGN PATENT DOCUMENTS

| DE | 1 950 036 U | 11/1966 |
| DE | 10 2005 019 482 A1 | 11/2006 |
| DE | 10 2006 004 752 A1 | 8/2007 |
| JP | U-58-036627 | 9/1981 |
| JP | A-11-048805 | 2/1999 |

OTHER PUBLICATIONS

European Search Report issued in European Patent Application No. 10171239.6 dated Nov. 11, 2010.

* cited by examiner

*Primary Examiner* — Thomas R Hannon
(74) *Attorney, Agent, or Firm* — Oliff & Berridge, PLC

(57) ABSTRACT

An outer ring has a tapered tubular portion having a tapered raceway surface, a small diameter side extension portion that extends radially outward from a small diameter side edge of the tapered tubular portion, and a large diameter side extension portion that extends from a large diameter side edge of the tapered tubular portion in a direction away from the axis of the outer ring. The small diameter side extension portion and the large diameter side extension portion are larger in thickness than the tapered tubular portion.

7 Claims, 1 Drawing Sheet

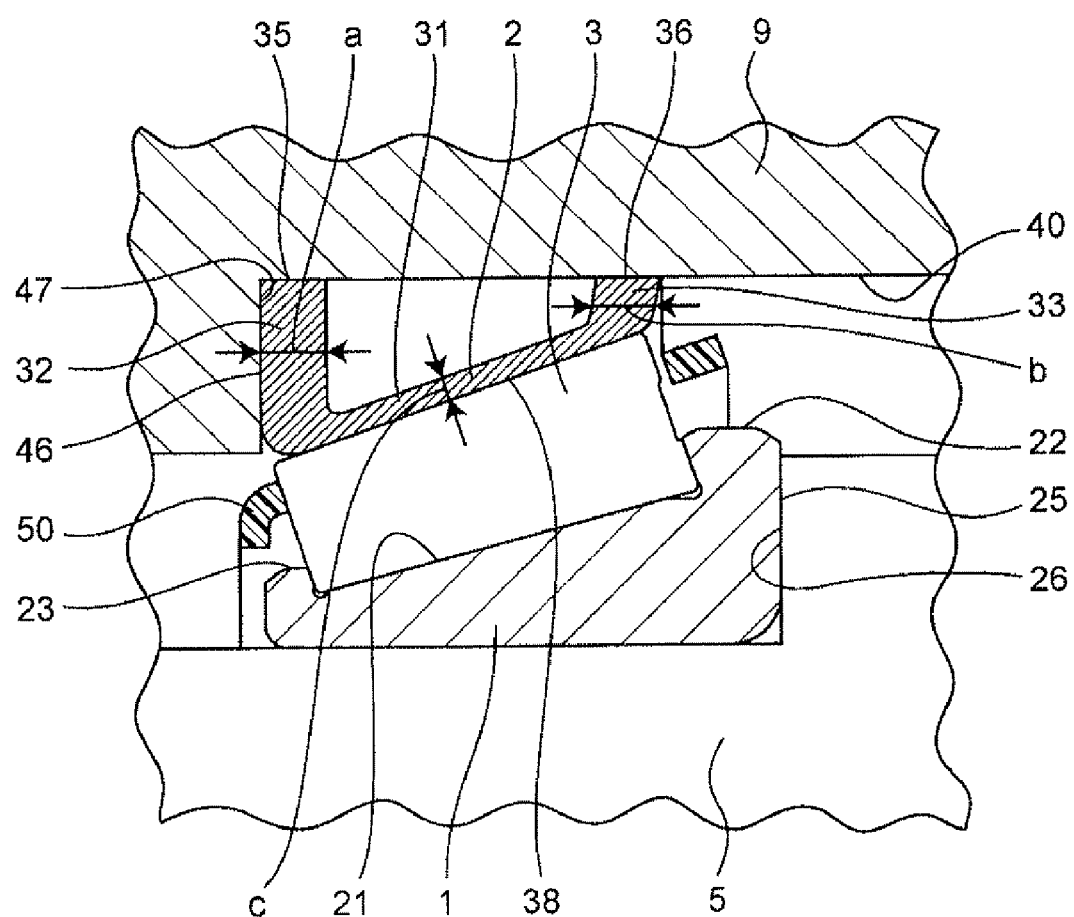

OUTER RING OF TAPERED ROLLER BEARING AND TAPERED ROLLER BEARING

INCORPORATION BY REFERENCE

The disclosure of Japanese Patent Application No. 2010-271519 filed on Dec. 6, 2010 including the specification, drawings and abstract, is incorporated herein by reference in its entirety.

BACKGROUND OF THE INVENTION

1. Field of the Invention

The invention relates to an outer ring of a tapered roller bearing, and a tapered roller bearing.

2. Description of Related Art

Japanese Patent Application Publication No. 11-48805 describes a conventional tapered roller bearing. This tapered roller bearing is provided in a differential gear unit, and supports a pinion shaft such that the pinion shaft is rotatable relative to a housing of the differential gear unit.

The tapered roller bearing described above includes an outer ring, an inner ring, and a plurality of tapered rollers. The outer peripheral face of the outer ring is fixedly fitted onto the inner peripheral face of the housing. The inner peripheral face of the inner ring is fixedly fitted onto the outer peripheral face of the pinion shaft. The tapered rollers are arranged at given intervals in the circumferential direction, between the tapered raceway surface of the outer ring and the tapered raceway surface of the inner ring. The tapered rollers are retained by a cage. The outer ring of the tapered roller bearing described above is solid.

However, weight reduction of the conventional tapered roller bearing described above is difficult because the outer ring is solid. If this tapered roller bearing is used in a vehicle, its large weight results in a higher operating cost and a higher material cost.

In addition, because the outer ring of the conventional tapered roller bearing described above is solid, the outer ring requires a large amount of machining, making the machining work more time-consuming. That is, the manufacturing cost of such an outer ring is high, which is not desirable.

SUMMARY OF THE INVENTION

It is an object of the invention to provide an outer ring of a tapered roller bearing and a tapered roller bearing that are lighter in weight and lower in operating cost, material cost, and manufacturing cost.

An aspect of the invention relates to an outer ring of a tapered roller bearing, including: a tapered tubular portion that has a tapered raceway surface formed at an inner periphery of the tapered tubular portion; a small diameter side extension portion that extends radially outward from a small diameter side edge of the tapered tubular portion; and a large diameter side extension portion that extends from a large diameter side edge of the tapered tubular portion in a direction away from an axis of the outer ring. The outer ring is made from a single metal plate. The thickness of the small diameter side extension portion and the thickness of the large diameter side extension portion are each larger than the thickness of the tapered tubular portion.

BRIEF DESCRIPTION OF THE DRAWINGS

The foregoing and further features and advantages of the invention will become apparent from the following description of example embodiments with reference to the accompanying drawing, wherein like numerals are used to represent like elements and wherein:

FIG. 1 is an axial sectional view of a tapered roller bearing according to an example embodiment of the invention.

DETAILED DESCRIPTION OF EMBODIMENTS

Hereafter, the invention will be described in more detail with reference to an example illustrated in the drawing.

FIG. 1 is a view schematically illustrating an axial section of a tapered roller bearing according to an example embodiment of the invention.

This tapered roller bearing includes an inner ring 1 that is an example of "inner raceway member", an outer ring 2, and a plurality of tapered rollers 3. The inner ring 1 is fixedly fit onto the outer peripheral face of a shaft member 5. The inner ring 1 has a tapered raceway surface 21, a large rib portion 22, and a small rib portion 23. The large rib portion 22 is located on the large diameter side of the tapered raceway surface 21, while the small rib portion 23 is located on the small diameter side of the tapered raceway surface 21. The shaft member 5 has a step portion 26 that extends radially. An end face 25, on the large diameter side of the tapered raceway surface 21, of the inner ring 1 is in contact with the step portion 26.

The outer ring 2 is formed by pressing a single metal plate. The metal plate is made of, for example, plastically deformable bearing steel (e.g., SUJ2), steel prepared by applying a hardening treatment(s), such as a carbonitriding treatment, to plastically deformable bearing steel, plastically deformable metal (e.g., Cold rolled carbon steel sheets and strip SPCC), carbon steel (e.g., S55C), chrome molybdenum steel (e.g., SCM415), and a material having a special property for easy pressing (e.g., N22CB, N35CB (products of Nisshin Steel Co., Ltd.)).

The outer ring 2 has a tapered tubular portion 31, a small diameter side extension portion 32, and a large diameter side extension portion 33.

The tapered tubular portion 31 has a tapered raceway surface 38 at its inner periphery. As shown in FIG. 1, as viewed in a section taken along the axis of the outer ring 2 (will hereinafter be referred to as "the axial section of the outer ring" where necessary), the small diameter side extension portion 32 extends radially outward from the small diameter side edge of the tapered tubular portion 31, while the large diameter side extension portion 33 extends from the large diameter side edge of the tapered tubular portion 31 in the direction away from the axis of the outer ring 2. More specifically, as viewed in the axial section of the outer ring 2, the large diameter side extension portion 33 is inclined with respect to the axis of the outer ring 2 such that the distance between the large diameter side extension portion 33 and the small diameter side extension portion 32 increases in the direction away from the axis of the outer ring 2. In other words, the large diameter side extension portion 33 is inclined with respect to the radial direction of the outer ring 2 such that the axial distance between the large diameter side extension portion 33 and the small diameter side extension portion 32 increases in the direction away from the axis of the outer ring 2.

As shown in FIG. 1, a radially outer end face 35 of the small diameter side extension portion 32 is a cylindrical outer peripheral face, and a radially outer end face 36 of the large diameter side extension portion 33 is also a cylindrical outer peripheral face. The cylindrical plane along which the radially outer end face 35 extends and that along which the radially outer end face 36 extends substantially coincide with each other. The outer diameter, measured at the radially outer end face 35, of the small diameter side extension portion 32 and the outer diameter, measured at the radially outer end face 36, of the large diameter side extension portion 33 are substantially equal to each other. The outer ring 2 is fixedly fitted onto an inner peripheral face 40 of a housing 9. More specifically, the radially outer end face 35 of the small diameter side extension portion 32 and the radially outer end face 36 of the large diameter side extension portion 33 are fixedly fitted onto the inner peripheral face 40 of the housing 9.

The small diameter side extension portion 32 and the large diameter side extension portion 33 are both larger in thickness than the tapered tubular portion 31. More specifically, in FIG. 1, a represents the thickness of the small diameter side extension portion 32, that is, the length of the small diameter side extension portion 32 as measured in a direction perpendicular to the direction in which the small diameter side extension portion 32 extends, and b represents the thickness of the large diameter side extension portion 33, that is, the length of the large diameter side extension portion 33 as measured in a direction perpendicular to the direction in which the large diameter side extension portion 33 extends. Further, in FIG. 1, c represents the thickness of the tapered tubular portion 31, that is, the thickness of the tapered tubular portion 31 excluding the large diameter side edge from which the large diameter side extension portion 33 extends and the small diameter side edge from which the small diameter side extension portion 32 extends. In other words, c represents the length of the tapered tubular portion 31 excluding the same edges, as measured in a direction perpendicular to the direction in which the tapered tubular portion 31 extends. It is to be noted that the unit of the thicknesses a, b, and c is centimeters (cm). In this example embodiment, the thicknesses a and b are substantially equal to each other, and each of the thicknesses a and b is from twice the thickness c to three times the thickness c.

An end face 46 of the small diameter side extension portion 32, which is on the opposite side of the small diameter side extension portion 32 from the large diameter side extension portion 33, is in contact with a step portion 47 of the housing 9, which extends radially. The end face 25, on the large diameter side of the tapered raceway surface 21, of the inner ring 1 is in contact with the step portion 26 of the shaft member 5, while the end face 46 of the small diameter side extension portion 32 of the outer ring 2 is in contact with the step portion 47 of the housing 9. Thus, the tapered roller bearing is axially sandwiched between the housing 9 and the shaft member 5, and thus an axial preload at a predetermined level is applied to the tapered roller bearing.

As shown in FIG. 1, the tapered rollers 3 are arranged at given intervals in the circumferential direction between the tapered raceway surface 21 of the inner ring 1 and the tapered raceway surface 38 of the tapered tubular portion 31 of the outer ring 2, and are retained by a cage 50.

The outer ring 2 is manufactured as follows, for example.

First, a flat metal plate is punched to form a through-hole in it. Then, the punched flat metal plate is plastically deformed, by cold pressing, into a tapered tubular form. Then, the small diameter side of the tapered tubular workpiece thus produced is then plastically deformed, by cold pressing, into a portion that extends radially outward, and the large diameter side of the tapered tubular workpiece is plastically deformed, by cold pressing, into a portion that extends radially outward. Then, the radially extending portions, formed at the small diameter side and large diameter side of the tapered tubular workpiece, respectively, are formed into given shapes by cold pressing.

More specifically, at this time, the radially extending portion formed at the small diameter side of the tapered tubular workpiece is set in a given mold having a gap and then plastically deformed multiple times into a form filling up the gap of the mold. This is how the small diameter side extension portion that is larger in thickness than the tapered tubular portion is formed. Similarly, the radially extending portion formed at the large diameter side of the tapered tubular workpiece is set in a given mold having a gap and then plastically deformed multiple times into a form filling up the gap of the mold. This is how the large diameter side extension portion that is larger in thickness than the tapered tubular portion is formed.

Finally, a known finishing process (e.g., grinding) is performed on the workpiece. This is how the outer ring 2 is manufactured. Meanwhile, depending upon the metallic material of the flat metal plate, preferably, a heating treatment (e.g., carburizing, carbonitriding, quenching, induction quenching, tempering, and a given combination among such treatments), and/or a hardening treatment (e.g., shot-peening) are applied to the outer ring formed as described above.

As such, in the example embodiment, the outer ring 2 is made from a single metal plate, which is much smaller in weight than a metal block, and therefore the mass of the outer ring 2 is significantly smaller than conventional solid outer rings. More specifically, the mass of the outer ring 2 according to the example embodiment is as small as approximately 40% of a solid outer ring of a conventional tapered roller bearing, of which the tapered raceway surface is substantially the same as that of the outer ring 2 (note that 40% is just an example, that is, it can be any other value depending on each case), and therefore the mass of the outer ring 2 is significantly smaller than the conventional solid outer ring. Therefore, using the outer ring 2 according to the example embodiment in a vehicle contributes to reduction of the vehicle weight, reduction of the operating cost, and reduction of the material cost, as compared to conventional solid outer rings. Further, because the outer ring 2 according to the example embodiment is made from a single metal plate, it is not necessary to perform machining, or the required amount of machining is small, resulting in a decrease in the manufacturing cost.

Further, because the outer ring 2 according to the example embodiment is a single piece part made from a single metal plate, there is no need of performing any part adjustment, unlike the case where the outer ring is constituted of a plurality of parts, and therefore the outer ring 2 can be easily attached, that is, the outer ring 2 is easy to handle.

In the outer ring 2 according to the example embodiment, the tapered raceway surface 38 is formed at the tapered tubular portion 31 so as to seamlessly extend in the axial direction of the outer ring 2. Therefore, almost entirety of the rolling contact surface of each tapered roller 3 is supported by the tapered tubular portion 31. Accordingly, the tapered rollers 3 are allowed to roll on the tapered raceway surface 38 stably and smoothly.

Further, because the outer ring 2 according to the example embodiment has the small diameter side extension portion 32 that extends radially outward (or substantially radially outward) from the smaller diameter side edge of the tapered tubular portion 31, it is possible to bring the small diameter side extension portion 32 into contact with the step portion 47 of the housing 9, which is axially next to the small diameter side extension portion 32. Therefore, the small diameter side extension portion 32 receives reactive force from the step portion 47 of the housing 9 and thus is able to bear an axial load.

With the outer ring 2 according to the example embodiment, the radially outer end face 35 of the small diameter side extension portion 32 and the radially outer end face 36 of the large diameter side extension portion 33 are fixedly fitted onto the inner peripheral face of the housing 9. Therefore, the outer ring 2 is fixedly fitted onto the inner peripheral face of the housing 9 at two points that are axially apart from each other. As a result, the outer ring 2 is stably and reliably fixed onto the housing 9.

In the outer ring 2 according to the example embodiment, the radial rigidity of the outer ring 2 is large because the thickness of each of the small diameter side extension portion 32 and large diameter side extension portion 33 is larger than the thickness of the tapered tubular portion 31. Therefore, the outer ring 2 does not buckle even if it receives large radial load.

In the outer ring 2 according to the example embodiment, the thickness of each of the small diameter side extension portion 32 and large diameter side extension portion 33 is larger than the thickness of the tapered tubular portion 31. Therefore, the force input in the outer ring 2 from the axial edges of each tapered roller 3 is received by the small diameter side extension portion 32 and the large diameter side extension portion 33, both of which have a large thickness, that is, the strengths of the portions of the outer ring 2 that contact the axial edges of each tapered roller 3 are large. Accordingly, it is possible to effectively minimize the possibility that the portions of the outer ring 2, which are in contact with the axial edges of each tapered roller 3, will crack (e.g., crack in the circumferential direction) due to the contact pressures from the axial edges of the respective tapered rollers 3.

Further, manufactured by pressing a single metal plate, the outer ring 2 according to the example embodiment is lower in production cost and more suitable for mass production.

In the outer ring 2 according to the example embodiment, as viewed in the axial section, the large diameter side extension portion 33 extends so as to be inclined with respect to the radial direction of the outer ring 2 such that the axial distance between the large diameter side extension portion 33 and the small diameter side extension portion 32 increases in the direction away from the axis of the outer ring 2. That is, the large diameter side extension portion 33 extends in a direction that is inclined with respect to the normal to the tapered raceway surface 38 of the outer ring 2 by an angle that is larger than the angle by which the small diameter side extension portion 32 is inclined with respect to the normal to the tapered raceway surface 38. As a result, the large diameter side extension portion 33 serves as a plate spring, or the like, and therefore the force input to the outer ring 2 from the rolling contact surface of each tapered roller 3 is elastically received by the large diameter side extension portion 33 due to its bending elasticity. Therefore, the vibrations from the tapered rollers 3 are more effectively absorbed. If the large diameter side extension portion 33 was formed so as to extend along the normal to the tapered raceway surface 38, the large diameter side extension portion 33 would deform in a compressed manner when receiving the vibrations from the tapered rollers 3, that is, it would absorb almost no vibrations from the tapered rollers 3.

Because the outer ring 2 is smaller in weight than conventional outer rings, the tapered roller bearing according to the example embodiment is significantly smaller in mass than conventional tapered roller bearings.

While the outer ring 2 according to the example embodiment is manufactured by pressing a single metal plate, an outer ring according to the invention may alternatively be manufactured from a single metal plate through other plastic working, such as form rolling and forging.

Further, while the outer ring 2 according to the example embodiment is made from a flat metal plate, an outer ring according to the invention may alternatively be manufactured by plastically deforming a seamless tubular metal part, and further an outer ring according to the invention may alternatively be manufactured by plastically deforming a seamed tubular metal part, such as an electric resistance welded tube.

The large diameter side extension portion 33 of the outer ring 2 according to the example embodiment extends so as to be inclined with respect to the radial direction of the outer ring 2 such that the axial distance between the large diameter side extension portion 33 and the small diameter side extension portion 32 increases in the direction away from the axis of the outer ring 2. Alternatively, an outer ring according to the invention may be formed such that the large diameter side extension portion extends substantially radially, or such that the axial distance between the large diameter side extension portion and the small diameter side extension portion decreases in the direction away from the axis of the outer ring 2.

The small diameter side extension portion 32 and large diameter side extension portion 33 of the outer ring 2 according to the example embodiment are substantially equal in thickness. Alternatively, an outer ring according to the invention may be formed such that the thickness of the small diameter side extension portion is smaller or larger than the thickness of the large diameter side extension portion.

The thickness of the small diameter side extension portion 32 of the outer ring 2 according to the example embodiment is from twice the thickness of the tapered tubular portion 31 to three times the same thickness. Alternatively, an outer ring according to the invention may be formed such that the thickness of the small diameter side extension portion is, for example, from 1.5 times the thickness of the tapered tubular portion to four times the same thickness. According to the invention, the thickness of the small diameter side extension portion may be any value as long as it is larger than the thickness of the tapered tubular portion.

The thickness of the large diameter side extension portion 33 of the outer ring 2 according to the example embodiment is from twice the thickness of the tapered tubular portion 31 to three times the same thickness. Alternatively, an outer ring according to the invention may be formed such that the thickness of the large diameter side extension portion is, for example, from 1.5 times the thickness of the tapered tubular portion to four times the same thickness. According to the invention, the thickness of the large diameter side extension portion may be any value as long as it is larger than the thickness of the tapered tubular portion.

The thickness of the small diameter side extension portion 32 of the outer ring 2 according to the example embodiment is substantially constant in substantially the entire region the direction in which the small diameter side extension portion 32 extends and the thickness of the large diameter side extension portion 33 of the outer ring 2 is substantially constant in substantially the entire region in the direction in which the large diameter side extension portion 33 extends. Alternatively, an outer ring according to the invention may be formed such that the thickness of the small diameter side extension portion varies along the direction in which the small diameter side extension portion extends, and/or such that the thickness of the large diameter side extension portion varies along the direction in which the large diameter side extension portion extends. According to the invention, the manner of setting the thickness of each of the small diameter side extension portion and the large diameter side extension portion is not particularly limited as long as at least a part of the small diameter side extension portion and at least a part of the large diameter side extension portion are larger in thickness than the tapered tubular portion.

While the tapered roller bearing in the example embodiment includes the inner ring 1 as "inner raceway member", an inner ring according to the invention may be such that a shaft member having a tapered raceway surface at its outer periphery, or an intermediate ring having a tapered raceway surface at its outer periphery is used as "inner raceway member".

Outer rings according to the invention may be manufactured also in the manners described below.

First, a small diameter side extension portion is formed by punching, at a low temperature, a flat metal disc to make a through-hole in it. Then, the radially inner side of the small diameter side extension portion is plastically deformed by cold pressing, so as to form a tapered tubular portion that is located on the radially inner side of the small diameter side extension portion and that increases in inner diameter in the direction away from the small diameter side extension portion. Then, the large diameter side extension portion is formed by bending, by cold pressing, the large diameter side of the tapered tubular portion radially outward. As a result, the small diameter side extension portion, the tapered tubular portion, and the large diameter side extension portion, which are substantially equal in thickness, are formed. Then, the tapered tubular portion is plastically deformed, by cold pressing, to be elongated, so that the thickness of the tapered tubular portion becomes smaller than the thicknesses of each of the small diameter side extension portion and large diameter side extension portion, in other words, the thicknesses of the small diameter side extension portion and large diameter side extension portion become larger than the thickness of the tapered tubular portion. Finally, the radially outer end faces of the small diameter side extension portion and large diameter side extension portion are each processed (e.g., grinded) into a given cylindrical outer peripheral face. This is one example method of manufacturing an outer ring according to the invention.

With regard to methods for making the thicknesses of each of the small diameter side extension portion and large diameter side extension portion larger than the thickness of the tapered tubular portion, for example, first, a small diameter side extension portion, a tapered tubular portion, and a large diameter side extension portion, which are almost equal in thickness, are formed. Then, only the small diameter side extension portion and the large diameter side extension portion are heated by, for example, induction heating, and then they are plastically deformed at a high temperature by, for example, hammering, so that the thicknesses each of the small diameter side extension portion and large diameter side extension portion become larger than the thickness of the tapered tubular portion. Meanwhile, in a case where an outer ring is formed through plastic deformation at a low temperature, preferably, a material containing a small amount of carbon is used as the material of the outer ring.

In the meantime, it is to be noted that the applications of the tapered roller bearings according to the example embodiment and modification examples presented above are not specifically limited. Further, it is to be noted that the tapered roller bearings according to the example embodiment and modification examples presented above may be used in both the environments in which the tapered rollers are in contact with the fluid(s) (e.g., lubricant, cleaning agent) externally supplied to the tapered roller bearing and the environments in which the tapered rollers are not in contact with the fluid(s).

It has been found that if an outer ring is formed by pressing a metal plate having a surface roughness equal or almost equal to that of the tapered raceway surface, a highly accurate raceway can be formed on the tapered raceway surface of the outer ring as a product. In this case, therefore, the process of grinding the tapered raceway surface, or the like, may be omitted if appropriate. As such, outer rings according to the invention allow further reductions of manufacturing time.

What is claimed is:

1. An outer ring of a tapered roller bearing, comprising:
   a tapered tubular portion that has a tapered raceway surface formed at an inner periphery of the tapered tubular portion;
   a small diameter side extension portion that extends radially outward from a small diameter side edge of the tapered tubular portion; and
   a large diameter side extension portion that extends from a large diameter side edge of the tapered tubular portion in a direction away from an axis of the outer ring,
   wherein the outer ring is made from a single metal plate; and
   wherein a thickness of the small diameter side extension portion and a thickness of the large diameter side extension portion are each larger than a thickness of the tapered tubular portion.

2. A tapered roller bearing comprising:
   the outer ring according to claim 1; and
   an inner raceway member that has a tapered raceway surface formed at an outer periphery of the inner raceway member; and
   a plurality of tapered rollers that are interposed between the tapered raceway surface of the tapered tubular portion of the outer ring and the tapered raceway surface of the inner raceway member.

3. The outer ring according to claim 1, wherein the outer ring is formed by pressing the single metal plate.

4. The outer ring according to claim 3, wherein as viewed in a section taken along the axis of the outer ring, the large diameter side extension portion is inclined with respect to the axis of the outer ring such that a distance between the large diameter side extension portion and the small diameter side extension portion increases in the direction away from the axis of the outer ring.

5. A tapered roller bearing comprising:
   the outer ring according to claim 3; and
   an inner raceway member that has a tapered raceway surface formed at an outer periphery of the inner raceway member; and
   a plurality of tapered rollers that are interposed between the tapered raceway surface of the tapered tubular portion of the outer ring and the tapered raceway surface of the inner raceway member.

6. The outer ring according to claim 1, wherein as viewed in a section taken along the axis of the outer ring, the large diameter side extension portion is inclined with respect to the axis of the outer ring such that a distance between the large diameter side extension portion and the small diameter side extension portion increases in the direction away from the axis of the outer ring.

7. A tapered roller bearing comprising:
   the outer ring according to claim 6; and
   an inner raceway member that has a tapered raceway surface formed at an outer periphery of the inner raceway member; and
   a plurality of tapered rollers that are interposed between the tapered raceway surface of the tapered tubular portion of the outer ring and the tapered raceway surface of the inner raceway member.

* * * * *